Aug. 17, 1926.
J. MILLER
1,596,678
WASHER HANDLING TOOL
Filed June 9, 1925
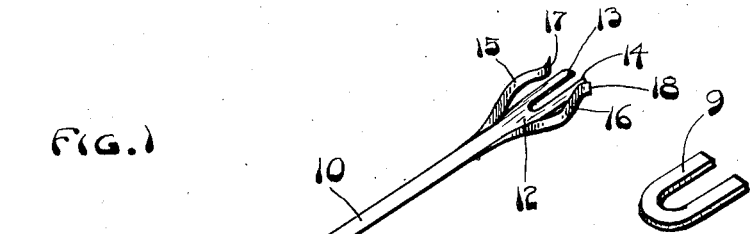
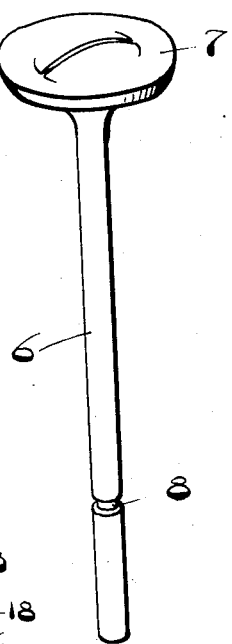
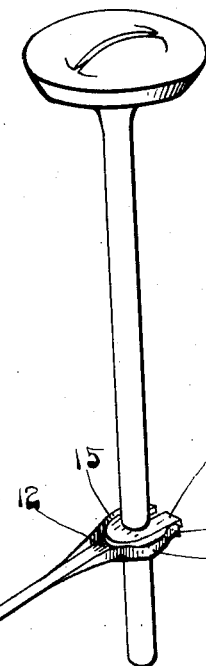
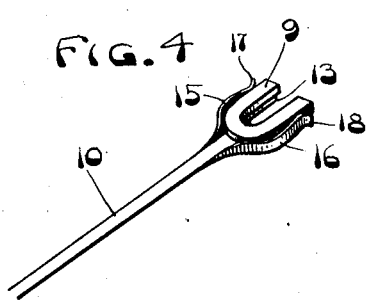
INVENTOR
Joseph Miller
BY Thornton Rogert
ATTORNEY Patented Aug. 17, 1926.

1,596,678

UNITED STATES PATENT OFFICE.

JOSEPH MILLER, OF CINCINNATI, OHIO.

WASHER-HANDLING TOOL.

Application filed June 9, 1925. Serial No. 35,908.

In poppet type valve constructions, such as found in internal combustion engines, the valve actuating springs are positioned in concentric relation with and upon the valve stems. Proper spring tension is maintained by a cup washer or the like which is held upon the valve stem by a suitable instrumentality such as a taper pin, cotter pin, nut, secondary washer, or similar device.

My improved tool is particularly designed to take care of such valve spring tension maintaining devices as fall within the class employing secondary washers. The most common of the forms of washers thus employed is the U-shaped washer.

An object of my invention is to produce a tool which will operate to effect the positioning and removal of such U-washers with ease and accuracy, which will permit of their being handled in cramped or confined spaces without danger of being dropped and perhaps lost among the parts of the engine, and which is simple, cheap to produce and sell, as well as of light weight and compact.

This and other objects are attained in the tool described in the following specification and illustrated in the accompanying drawing in which:

Fig. 1 is a perspective view of the tool embodying my invention.

Fig. 2 is a perspective view of the washer for which the tool is designed for use.

Fig. 3 is a perspective view of a valve which is typical of the type to which the washer and tool are particularly adapted.

Fig. 4 is a fragmental perspective view of the tool with a U-washer in position therein, which, with its proximity to Fig. 3, may be taken to illustrate how the disassembled relation of the valve and U-washer appears.

Fig. 5 is a perspective view of the assembled valve and washer, the tool being shown in position ready for removal of the washer or just as it has placed the washer in its proper position with relation to the valve.

In the type of valve I have shown in Figs. 3 and 5, the stem 6 to which the head 7 is attached, is formed adjacent to its end with a slot or annular groove 8 which is of such a width as to receive the U-shaped washer 9 which I have shown in detail perspective in Fig. 2. This washer is of U-shape and is merely slipped into the slot 8 after which the tension of the valve spring holds it in place, while it in turn maintains the tension of the valve spring. In the actual handling of such a washer the difficulties the mechanic encounters are created not only by the small size of the washer but also by the restricted space within which he has to work. Frequently the washer will be inadvertently dropped into the parts of the engine or into the accumulated dirt in the drip pan beneath the engine, thus entailing annoying losses of time and labor. The tool I have devised has been designed to overcome all such objections as have been mentioned above.

The preferred form of tool which I have shown, consists of a shank 10 having the usual handle 11 at one end and the head of the tool at the other end. This head end embodies the novel features of the invention and consists of a forked palette 12 having branches 13 and 14, upon the sides of which spring fingers 15 and 16 are located. The branches 13 and 14 of the palette are spaced apart so as to straddle the valve stem 6 when the tool is brought into position therewith in working with the washer, while also furnishing a support for the branches of the U-washer. The spring fingers 15 and 16 have outturned ends 17 and 18 so that the washer may be easily engaged by pushing the tool into engagement therewith, thereby spreading the fingers apart against the spring tension exerted by them, and resulting in the firm gripping of the washer as it is supported flatwise upon the palette, as shown in Fig. 4. By bringing the washer thus supported by the tool, into engagement with the slot 8, as shown in Fig. 5, the valve spring (not shown) is let down upon it and the tool is disengaged by being pushed downwardly or by having the washer removed as it were from between the fingers in a direction at right angles to the plane occupied by the washer and the fingers, thus leaving the washer in place on the valve stem. In removing the washer from the stem, first the spring pressure is released therefrom and then the tool is pressed into engagement with the washer as shown in Fig. 5, after which withdrawal of the tool will carry the washer with it as shown in Fig. 4.

The form of tool I have shown is merely a suggested one which serves to illustrate the principle upon which the invention operates, and the described operation of its use in connection with U-washers is but by way of example as it is as readily adapted to usage with washers of any other form in ways which will suggest themselves to those having occasion to use the tool.

Having thus described my invention what I claim is:

1. A washer tool comprising a handled shank having a head at its operative end, said head consisting of a pair of spring fingers adapted to grasp a washer edgewise and to permit the washer being pushed from between the fingers in a direction at right angles to the plane occupied by the washer and fingers, with a washer receiving palette located between and independent of the fingers and adapted to support a washer thereon.

2. A washer tool comprising a handled shank having a head at its operative end, said head consisting of a pair of spring fingers adapted to grasp a washer edgewise between them and to permit the washer being pushed from between the fingers in a direction at right angles to the plane occupied by the washer and fingers, and a bifurcated palette between and independent of the fingers, adapted to support a washer thereon, said palette bifurcations being adapted to embrace a stem designed to receive a washer capable of being held by the tool.

3. A washer tool comprising a handled shank having a head at its operative end, said head consisting of a palette adapted to receive flatwise a washer to be handled, and spring fingers independent of the palette adapted to grasp the edges of a washer upon the palette and to permit the washer being pushed from between the fingers in a direction at right angles to the plane occupied by the washer and fingers.

4. A washer tool comprising a handled shank having a head at its operative end, said head consisting of a pair of spring fingers adapted to grasp a washer edgewise between them and to permit the washer being pushed from between the fingers in a direction at right angles to the plane occupied by the washer and fingers, and a bifurcated palette independent of and between the fingers, adapted to support a washer flatwise thereon, said palette bifurcations being adapted to embrace a stem designed to receive a washer capable of being held by the tool.

In testimony whereof I have hereunto affixed my signature.

JOSEPH MILLER.